(12) United States Patent
Shimizu et al.

(10) Patent No.: US 12,546,754 B2
(45) Date of Patent: Feb. 10, 2026

(54) ANALYZER COLUMN CARTRIDGE

(71) Applicant: HITACHI HIGH-TECH CORPORATION, Tokyo (JP)

(72) Inventors: Yusuke Shimizu, Tokyo (JP); Yoshito Watanabe, Tokyo (JP); Yu Iijima, Tokyo (JP); Shuhei Yamamura, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 291 days.

(21) Appl. No.: 18/261,299

(22) PCT Filed: Dec. 7, 2021

(86) PCT No.: PCT/JP2021/044932
§ 371 (c)(1),
(2) Date: Jul. 13, 2023

(87) PCT Pub. No.: WO2022/176328
PCT Pub. Date: Aug. 25, 2022

(65) Prior Publication Data
US 2024/0060942 A1  Feb. 22, 2024

(30) Foreign Application Priority Data
Feb. 19, 2021 (JP) .................. 2021-025673

(51) Int. Cl.
*G01N 30/54* (2006.01)
*B01D 15/16* (2006.01)
(Continued)

(52) U.S. Cl.
CPC ....... *G01N 30/6091* (2013.01); *B01D 15/161* (2013.01); *G01N 30/54* (2013.01); *G01N 2030/027* (2013.01)

(58) Field of Classification Search
CPC .............. G01N 30/6091; G01N 30/54; G01N 2030/027; B01D 15/161
See application file for complete search history.

(56) References Cited

U.S. PATENT DOCUMENTS 5,468,962 A * 11/1995 Ohishi ............... G01N 21/3504
250/343
2013/0052083 A1* 2/2013 Kirby ..................... F24H 1/142
392/465
(Continued)

FOREIGN PATENT DOCUMENTS

JP          49-15239 B1    4/1974
JP          2011-133453 A  7/2011
(Continued)

OTHER PUBLICATIONS

International Search Report, mailed Jan. 11, 2022, for International Application No. PCT/JP2021/044932.
(Continued)

*Primary Examiner* — David J Bolduc
(74) *Attorney, Agent, or Firm* — Baker Botts L.L.P.

(57) ABSTRACT

Provided is an analyzer column cartridge that can control the temperature of an analysis column while saving resources and costs. An analyzer column cartridge 1 includes: metal blocks 7, 8 that accommodate an analysis column 10 used in a liquid chromatography; and housings 2, 3 that accommodate the metal blocks 7, 8. A plurality of holes 11A, 11B, 11C, 11D, and 11E that communicate with an accommodation space of the analysis column 10 are formed in the metal block 8. The housing has a plurality of windows 6A, 6B, 6C, 6D, and 6E formed at positions facing the plurality of holes 11A, 11B, 11C, 11D, and 11E formed in the metal block 8.

7 Claims, 12 Drawing Sheets

(51) Int. Cl.
  *G01N 30/60*   (2006.01)
  *G01N 30/02*   (2006.01)

(56) References Cited

U.S. PATENT DOCUMENTS

| | | | |
|---|---|---|---|
| 2013/0180405 A1* | 7/2013 | Currie | G01N 30/54 |
| | | | 96/101 |
| 2016/0282315 A1* | 9/2016 | Shimizu | G01N 30/30 |
| 2019/0033271 A1 | 1/2019 | Sabolis et al. | |
| 2020/0025724 A1* | 1/2020 | Simpson | G01N 30/88 |
| 2020/0209200 A1* | 7/2020 | Ishihara | G01N 30/54 |

FOREIGN PATENT DOCUMENTS

| | | |
|---|---|---|
| JP | 2016-101556 A | 6/2016 |
| WO | WO 2012/058515 A2 | 5/2012 |

OTHER PUBLICATIONS

Written Opinion, mailed Jan. 11, 2022, for International Application No. PCT/JP2021/044932 (without English translation).

* cited by examiner

ANALYZER COLUMN CARTRIDGE

TECHNICAL FIELD

The present invention relates to an analyzer column cartridge for analyzing samples.

BACKGROUND ART

As an analysis method using an analysis column, there is liquid chromatography. The analysis column is an item in which a long, slender, cylindrical container is filled with a filler made of particles having various functional groups bonded to a base material such as silica gel and polymer gel at high pressure.

The liquid chromatography uses a liquid as a mobile phase. Typically, in order to obtain a result of a good peak shape in the liquid chromatography, the temperature of the analysis column has to be controlled at an optimum temperature. As the temperature of the mobile phase in the analysis column increases, the viscosity of the mobile phase decreases, which drops the pressure.

Therefore, the analysis column of the liquid chromatography has to be held in a column oven, and the temperature of the column has to be controlled.

Patent Literature 1 discloses a column cartridge accommodating two analysis columns, a heater, and a temperature sensor.

In the column cartridge described in Patent Literature 1, since two columns are installed in one column cartridge, a column cartridge is handled for at least every two analysis columns.

CITATION LIST

Patent Literature

Patent Literature 1: WO/2012/058515

SUMMARY OF INVENTION

Technical Problem

In the column cartridge described in Patent Literature 1, in the case in which one of the analysis columns in the column cartridge is degraded in performance or clogged, it is necessary to replace an analysis column whose performance is degraded, for example.

In this case, it is necessary to replace the entire column cartridge, leading to waste to discard columns, a heater, and a temperature sensor that are still usable, which is against resource savings and cost savings.

Moreover, when the column cartridge is discarded, the column cartridge has to be disassembled, and the analysis column, the heater, the temperature sensor, the electronic component, and the like have to be separated, resulting in troublesome work.

When the heater or the temperature sensor is eliminated from the inside of the column cartridge, the temperature control of the analysis column becomes difficult. Thus, it is not possible to simply eliminate the heater or the temperature sensor from the inside of the column cartridge.

An object of the present invention is to achieve the analyzer column cartridge that enables the temperature control of an analysis column while resource savings and cost savings are possible.

Solution to Problem

In order to achieve the object, the present invention is configured as follows.

The analyzer column cartridge has a metal block configured to accommodate an analysis column used in a liquid chromatography and a housing that accommodates the metal block. A plurality of holes that communicate with an accommodation space of the analysis column are formed in the metal block, and the housing has a plurality of windows formed at positions respectively facing the plurality of holes formed in the metal block.

Effect of the Invention

According to the present invention, it is possible to achieve the analyzer column cartridge that enables the temperature control of an analysis column while resource savings and cost savings are possible.

DESCRIPTION OF EMBODIMENTS

In the following, embodiments of the present invention will be described in detail with reference to the accompanying drawings.

EMBODIMENT

First Embodiment

In the following, a first embodiment of the present invention will be described in detail with reference to FIG. 1 to FIG. 12.

Figure 1:
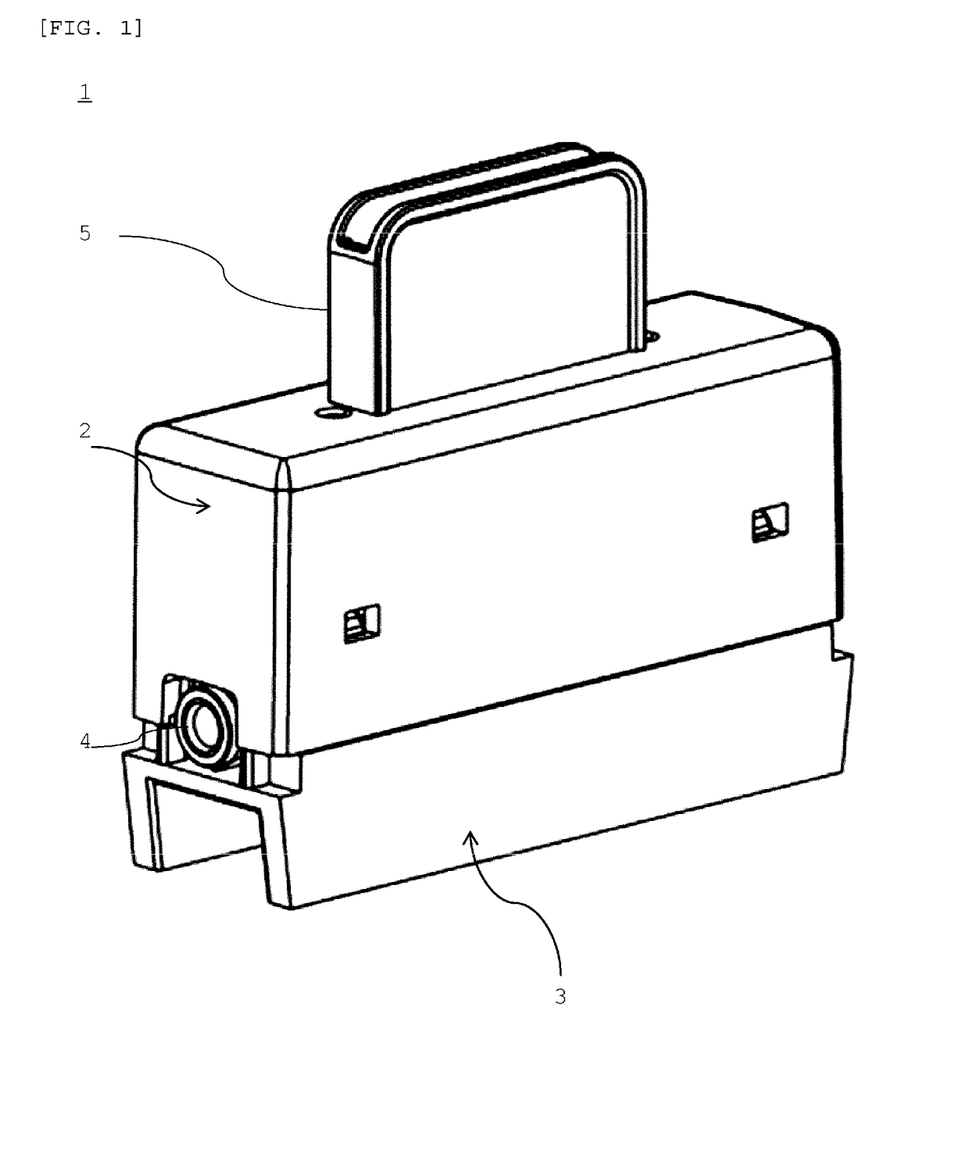
FIG. 1 is a perspective outside view of a column cartridge according to a first embodiment.

FIG. 1 is a perspective outside view of a column cartridge 1 of an analyzer (liquid chromatography) according to the first embodiment. In FIG. 1, the column cartridge 1 includes a resin upper housing portion 2 and a resin lower housing portion 3. The upper housing portion 2 and the lower housing portion 3 form a housing. On the top surface of the upper housing portion 2, a handle portion (projection) 5 is formed. Between the upper housing portion 2 and the lower housing portion 3, a channel opening 4 is formed. Into this channel opening 4, a mobile phase flows.

Figure 2:
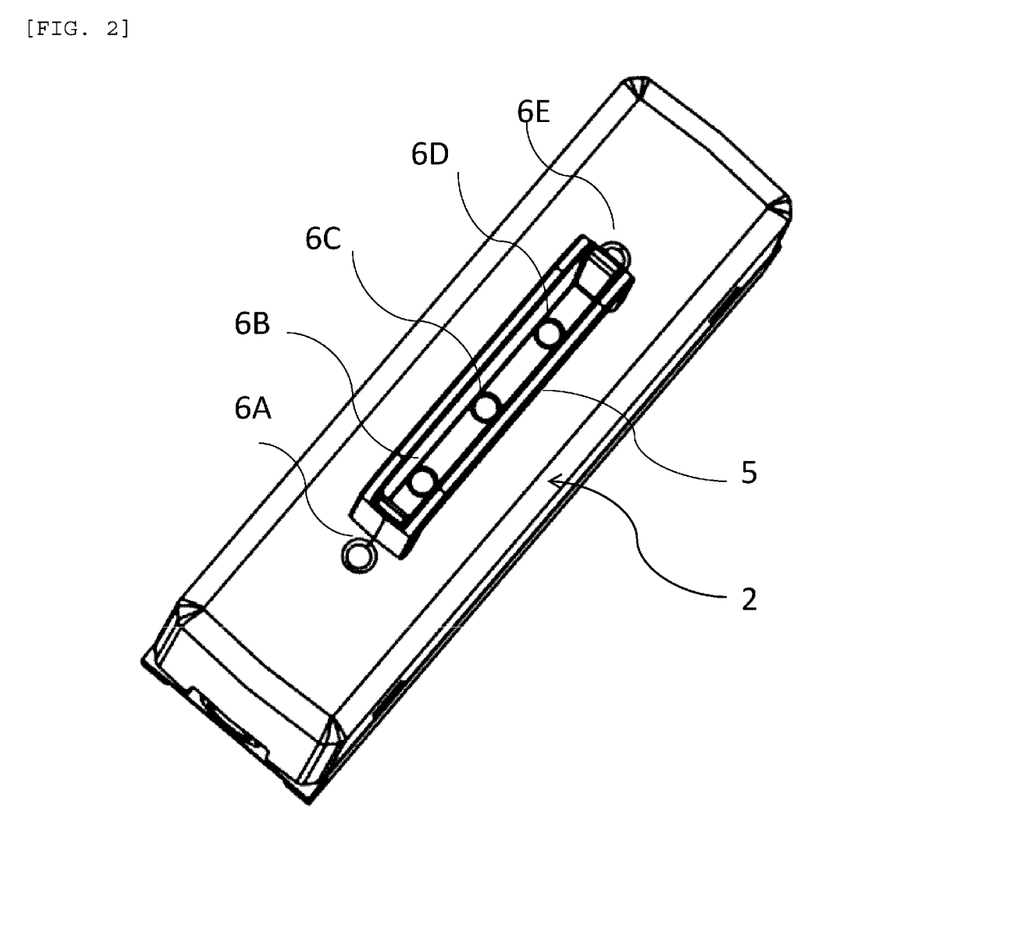
FIG. 2 is a top view of the column cartridge shown in FIG. 1.

FIG. 2 is a top view of the column cartridge 1. In FIG. 2, on the top surface of the upper housing portion 2 of the column cartridge 1, temperature detection windows 6A, 6B, 6C, 6D, and 6E are formed. These communicate with the accommodation space of an analysis column 10 in a columnar shape, described later. Moreover, the windows 6A, 6B, 6C, 6D, and 6E are disposed along the long direction of the analysis column 10. The windows 6B, 6C, and 6D are partially formed at positions where a handle portion 5 is formed.

The diameters of the windows 6A, 6B, 6C, 6D, and 6E are desirably about 1.4 mm or less.

Figure 3:
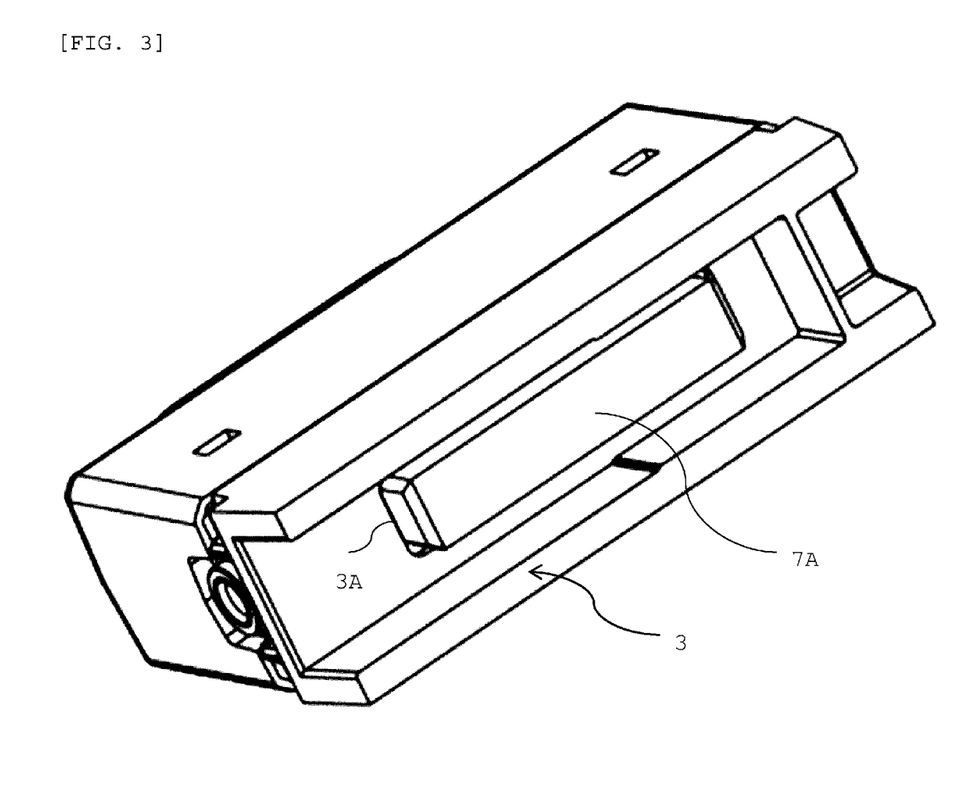
FIG. 3 is a bottom view of the column cartridge shown in FIG. 1.

FIG. 3 is the bottom view of the column cartridge 1. In FIG. 3, on the bottom surface of the lower housing portion 3, an opening 3A is formed, and a heat transfer portion 7A of a lower metal block portion 7, described later, is inserted into this opening 3A, and is exposed to the outside of the lower housing portion 3. This heat transfer portion 7A contacts a heat source (not shown), and transmits heat to the analysis column 10.

Figure 4:
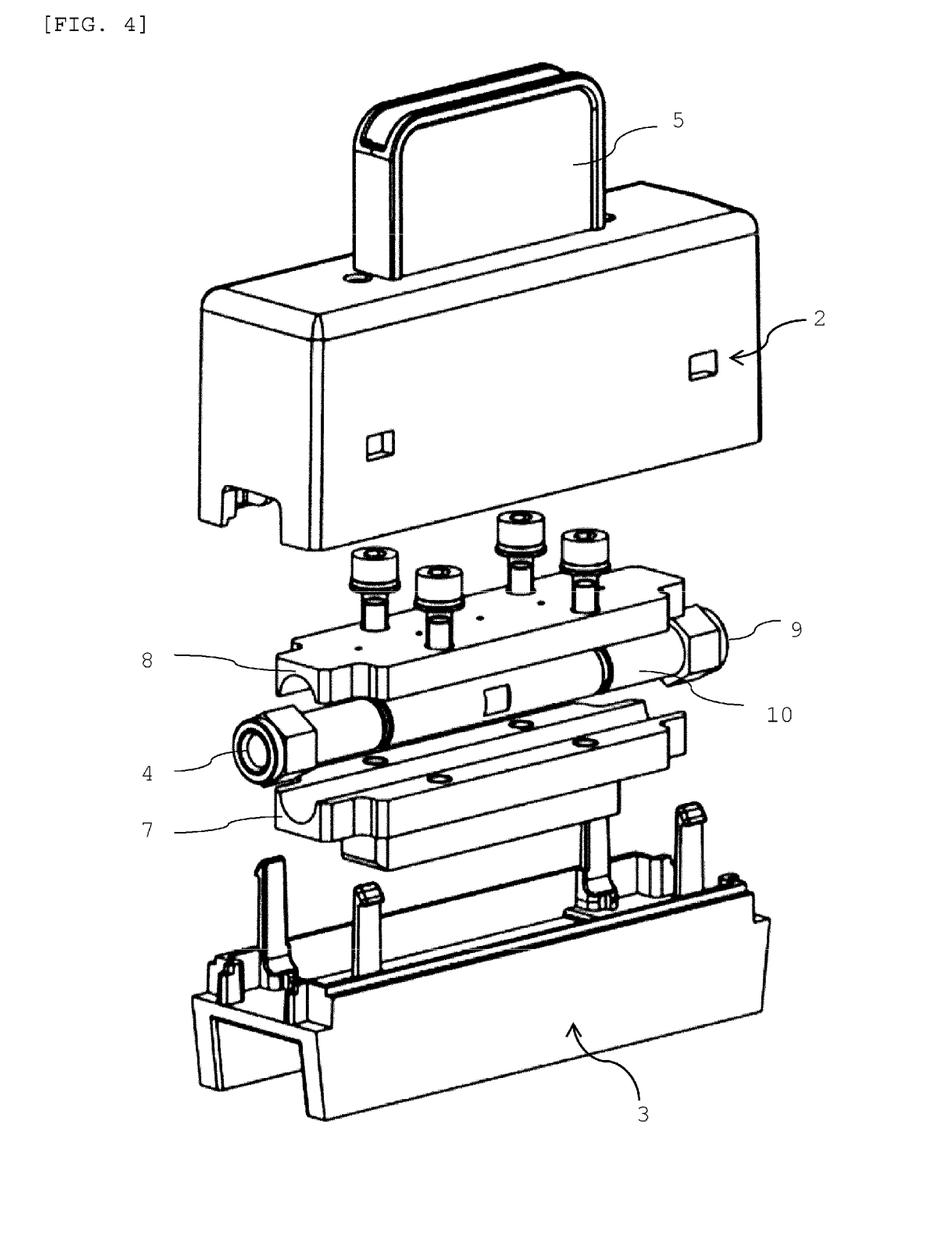
FIG. 4 is an exploded perspective view of the column cartridge shown in FIG. 1.

FIG. 4 is the exploded perspective view of the column cartridge 1. In FIG. 4, between the upper housing portion 2 and the lower housing portion 3, an upper metal block portion 8 and the lower metal block portion 7 are arranged. The upper metal block portion 8 and the lower metal block portion 7 are formed of metal such as aluminum having a coefficient of high thermal conductivity. The upper metal block portion 8 and the lower metal block portion 7 form a metal block.

The upper metal block portion 8 is arranged facing the upper housing portion 2, and arranged facing the lower metal block portion 7.

Moreover, between the upper metal block portion 8 and the lower metal block portion 7, the analysis column 10 is arranged. The analysis column 10 is arranged between the channel opening 4 and the channel opening 9, and a liquid such as a mobile phase flows into and out of the inside of the analysis column 10.

Figure 5:
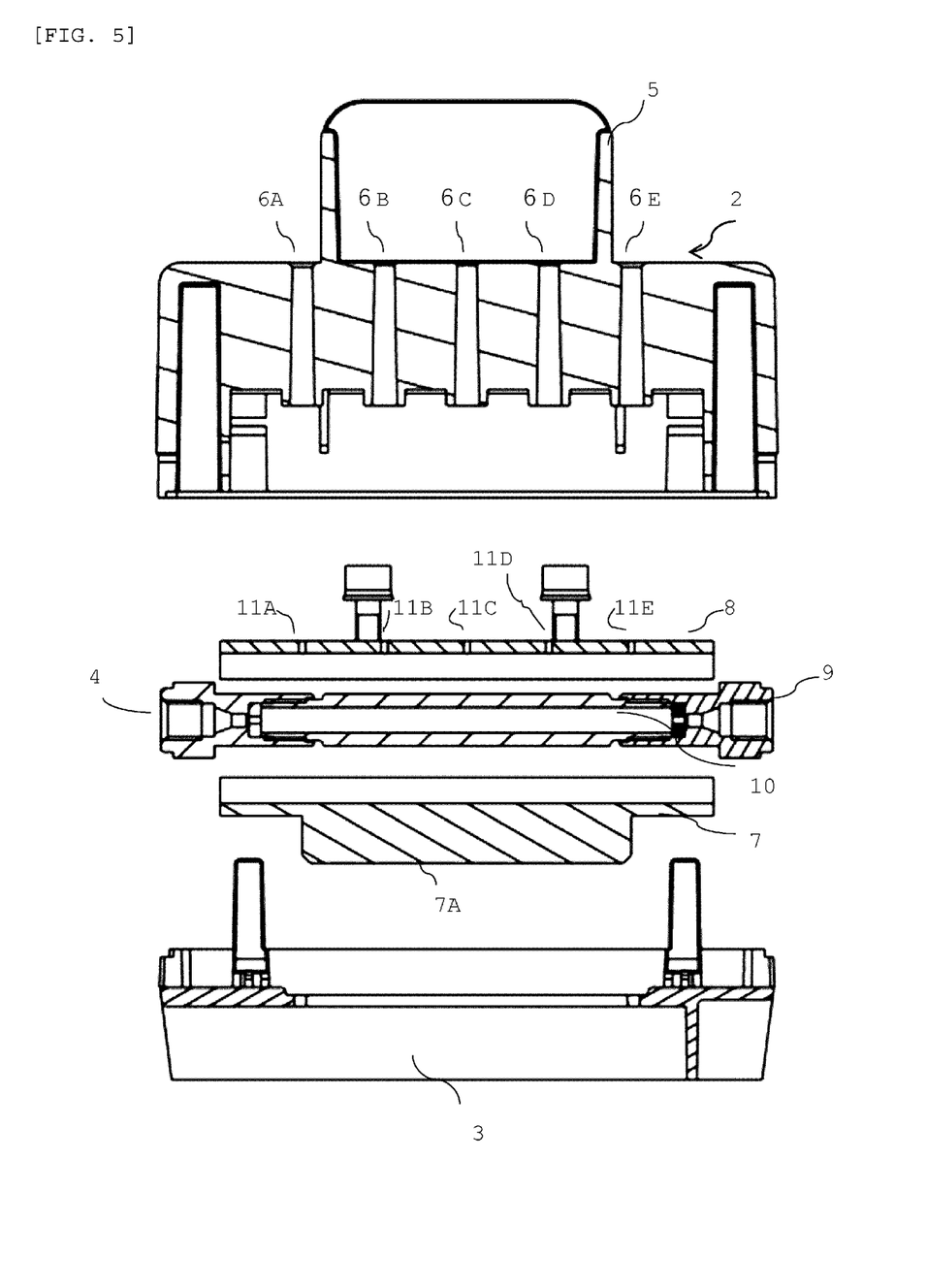
FIG. 5 is an exploded cross-sectional view of the column cartridge shown in FIG. 1.

FIG. 5 is the exploded cross-sectional view of the column cartridge 1. In FIG. 5, on the top surface of the upper metal block portion 8, a plurality of holes 11A, 11B, 11C, 11D, and 11E are formed. The holes 11A, 11B, 11C, 11D, and 11E are formed at positions facing the windows 6A, 6B, 6C, 6D, and 6E.

The diameters of the holes 11A, 11B, 11C, 11D, and 11E are desirably about 0.8 mm or less.

Figure 6:
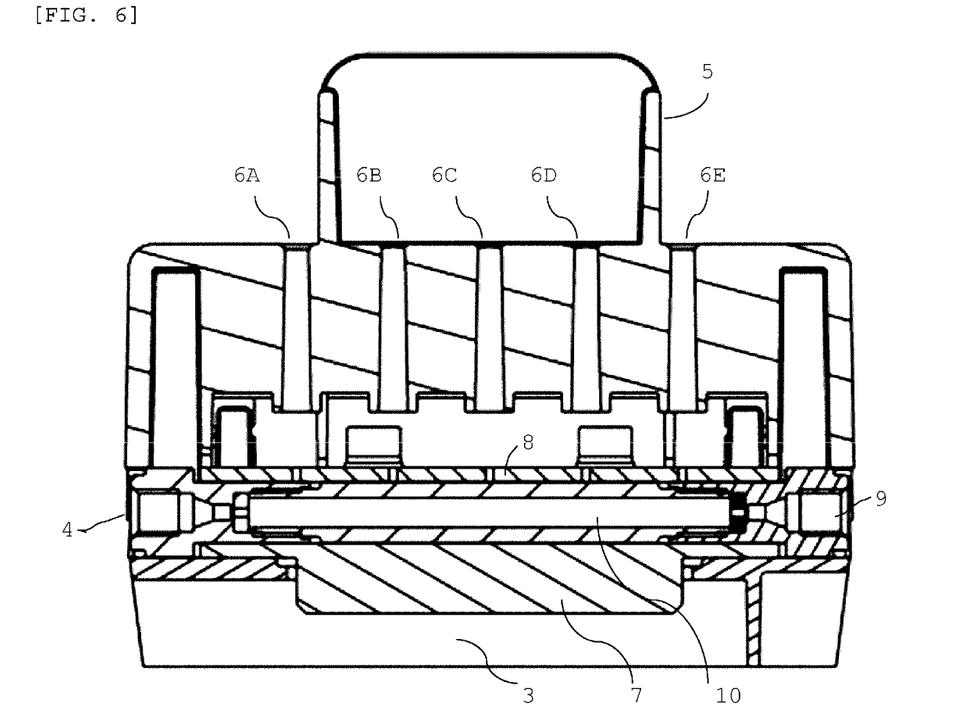
FIG. 6 is a cross-sectional view of the column cartridge shown in FIG. 1.

FIG. 6 is the cross-sectional view of the column cartridge 1. As described above, in FIG. 6, the holes 11A, 11B, 11C, 11D, and 11E are formed at positions facing the windows 6A, 6B, 6C, 6D, and 6E.

Figure 7:
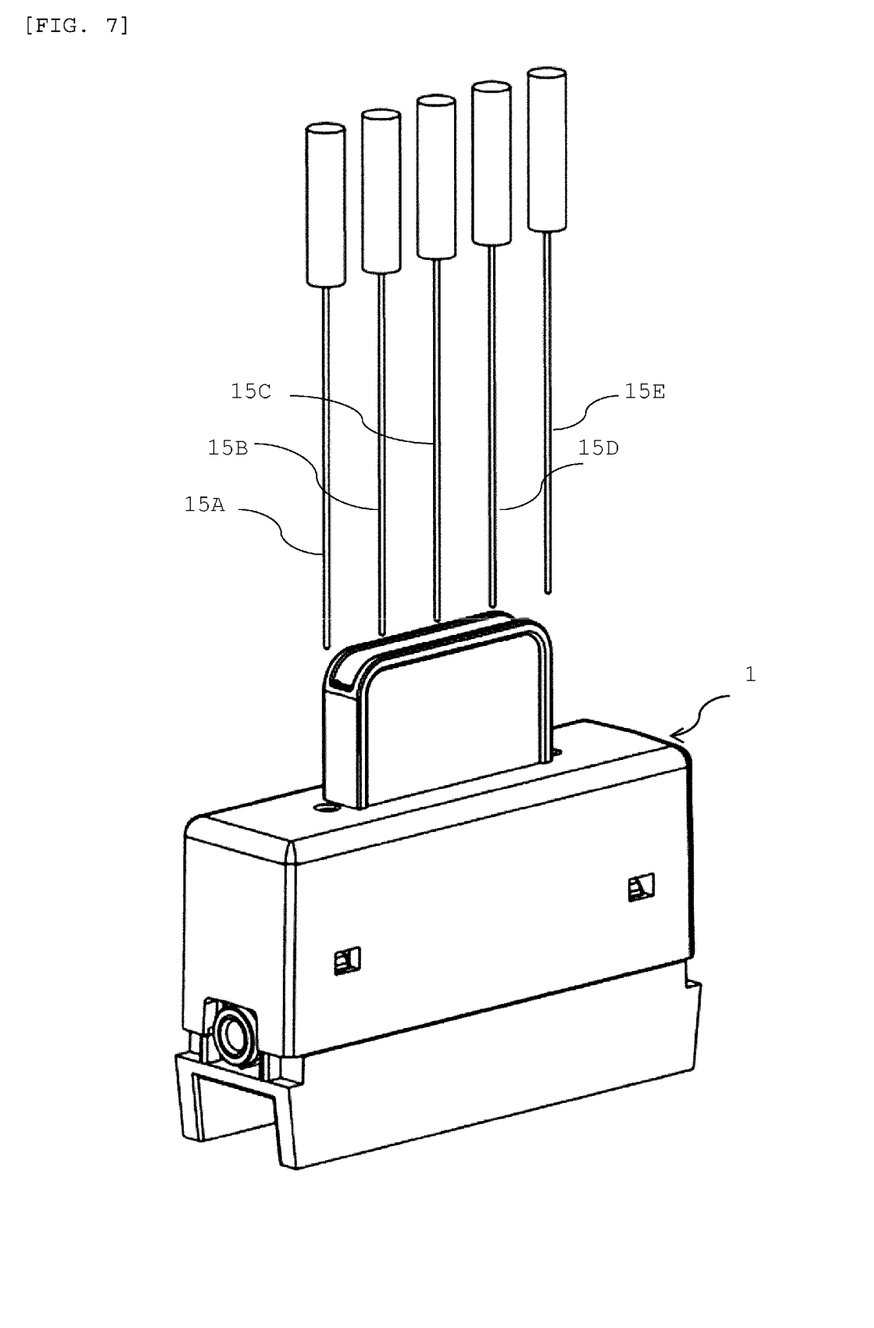
FIG. 7 is an explanatory view of an example of measuring a temperature of an analysis column inside the column cartridge.

FIG. 7 is the explanatory view of the example of measuring the temperature of the analysis column 10 inside the column cartridge 1. In FIG. 7, rod-shaped temperature sensor probes 15A, 15B, 15C, 15D, and 15E are inserted into the windows 6A, 6B, 6C, 6D, and 6E formed on the top surface of the upper housing portion 2.

The diameters of the temperature sensor probes 15A, 15B, 15C, 15D, and 15E are desirably about 0.7 mm or less.

Figure 8:
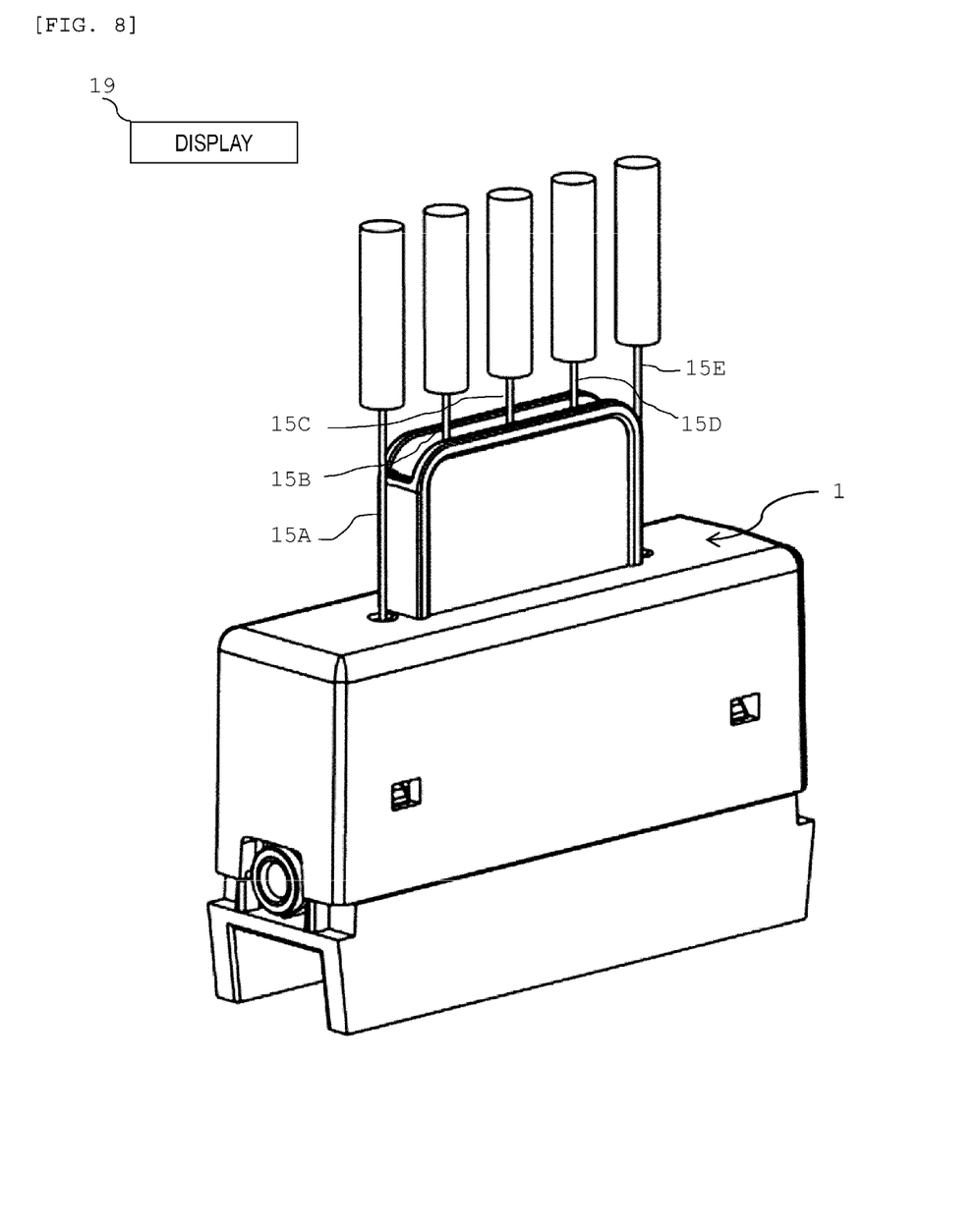
FIG. 8 is an explanatory view of an example of measuring the temperature of the analysis column inside the column cartridge.

FIG. 8 is a view showing a state where the temperature sensor probes 15A, 15B, 15C, 15D, and 15E are inserted into the windows 6A, 6B, 6C, 6D, and 6E, and the tip end parts of the temperature sensor probes 15A, 15B, 15C, 15D, and 15E reach the accommodation space of the analysis column 10.

The temperature of the analysis column 10 measured by the temperature sensor probes 15A, 15B, 15C, 15D, and 15E is displayed on a display 19. It is possible to confirm a temperature difference and a temperature gradient in the flowing direction of the mobile phase in the analysis column 10 while the heat of the analysis column 10 is transferred and a liquid is delivered into the analysis column 10 by the temperature sensor probes 15A, 15B, 15C, 15D, and 15E.

The temperature sensor probes 15A, 15B, 15C, 15D, and 15E and the display 19 transmit and receive temperature detection signals in a wireless manner or temperature detection signals through a cable.

Moreover, the temperature sensor probes 15A, 15B, 15C, 15D, and 15E individually have a temperature display unit.

Figure 9:
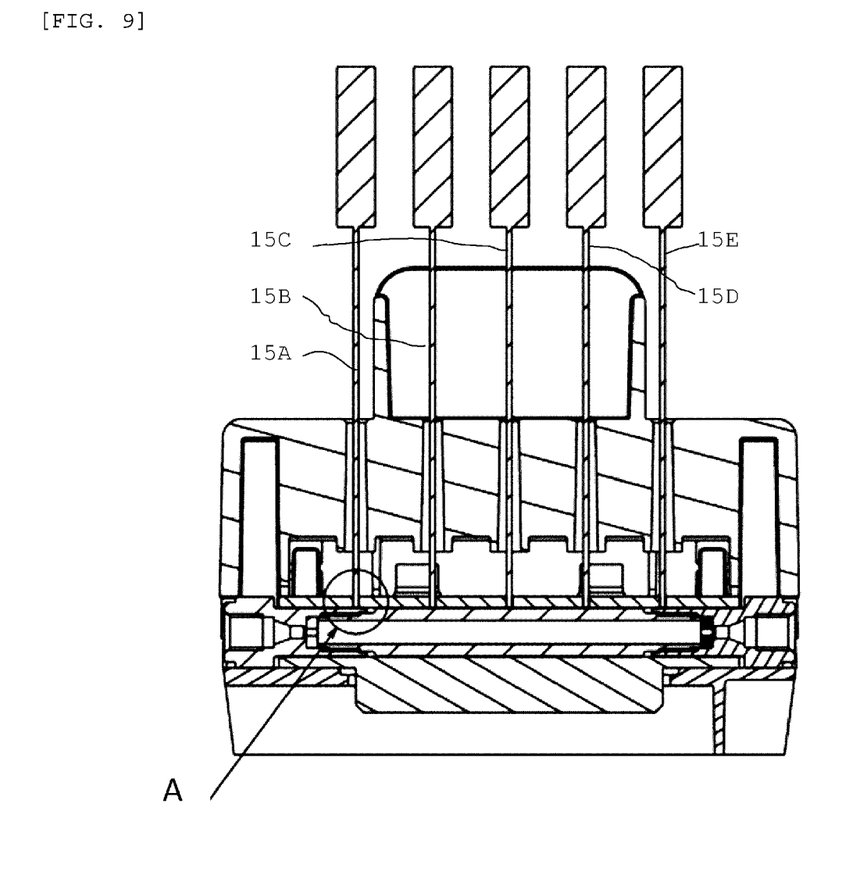
FIG. 9 is an explanatory view of an example of measuring the temperature of the analysis column inside the column cartridge.
Figure 10:
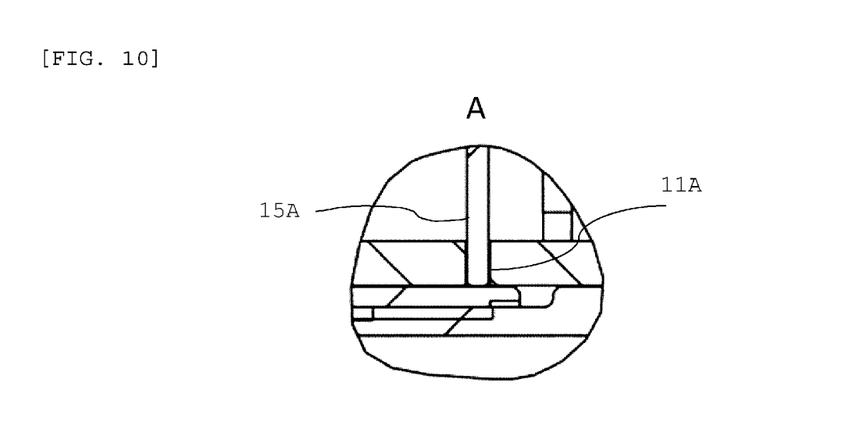
FIG. 10 is an enlarged view of a portion A shown in FIG. 9.

FIG. 9 is an explanatory view of an example of measuring the temperature of the analysis column 10 inside the column cartridge 1, showing a cross section of the column cartridge 1. FIG. 10 is the enlarged view of the portion A shown in FIG. 9. The temperature sensor probes 15A, 15B, 15C, 15D, and 15E pass the windows 6A, 6B, 6C, 6D, and 6E, and are inserted into the holes 11A, 11B, 11C, 11D, and 11E formed in the upper metal block portion 8.

FIG. 10 shows a state where the temperature sensor probe 15A is inserted into the hole 11A. The temperature sensor probe 15B, 15C, 15D, and 15E are inserted into the holes 11B, 11C, 11D, and 11E, similarly to the temperature sensor probe 15A.

The tip ends of the temperature sensor probes 15A, 15B, 15C, 15D, and 15E can be brought into contact with the surface of the analysis column 10.

The temperature sensor probes 15A, 15B, 15C, 15D, and 15E can detect temperatures at five sites in the long direction of the analysis column 10. The temperatures at five sites in the long direction of the analysis column 10 are detected, and thus it is possible to sense the temperature profile of the entire analysis column 10, and it is possible to determine whether a balance is achieved at a prescribed temperature. Moreover, in the case in which a contact failure occurs between the heat transfer portion 7A of the lower metal block portion 7 and the analysis column 10, it is possible to detect this failure.

Figure 11:
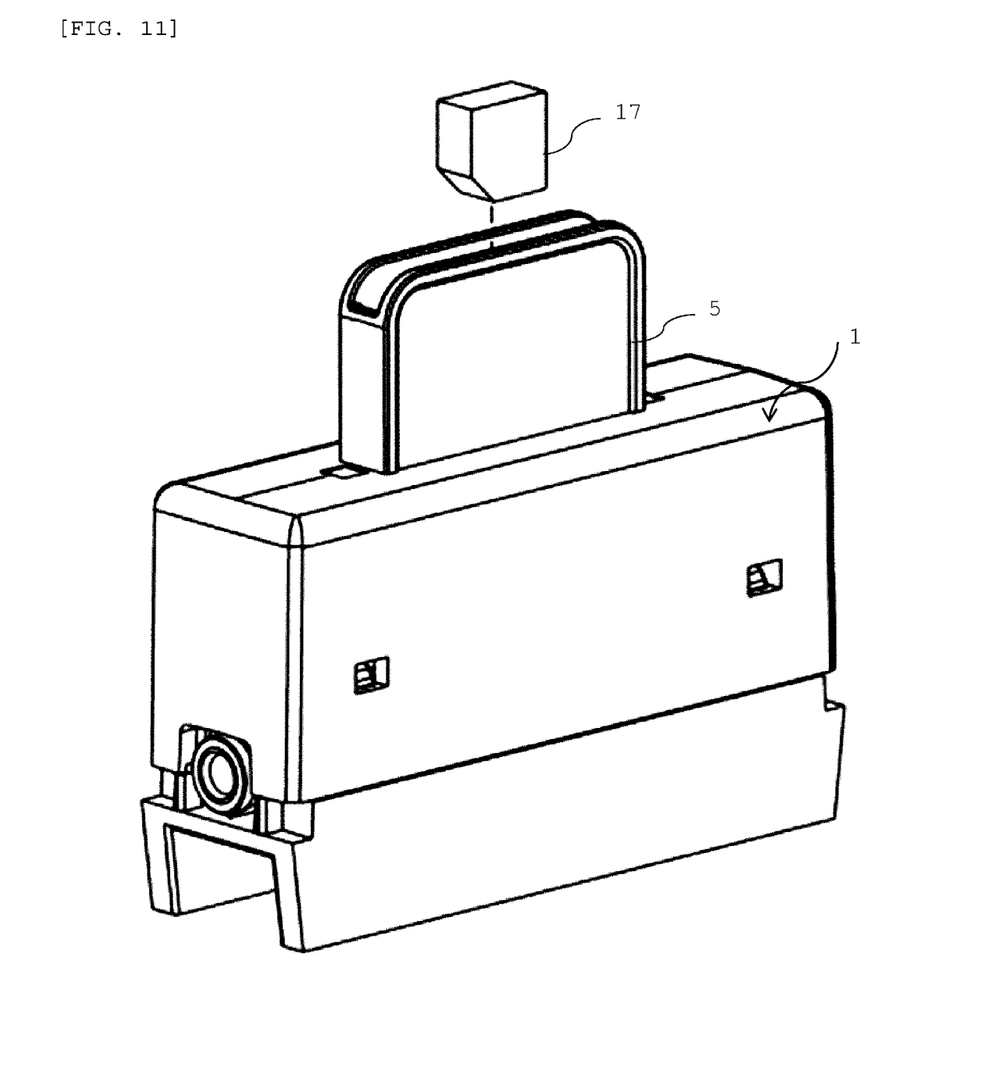
FIG. 11 is an explanatory view of another example of measuring the temperature of the analysis column inside the column cartridge.
Figure 12:
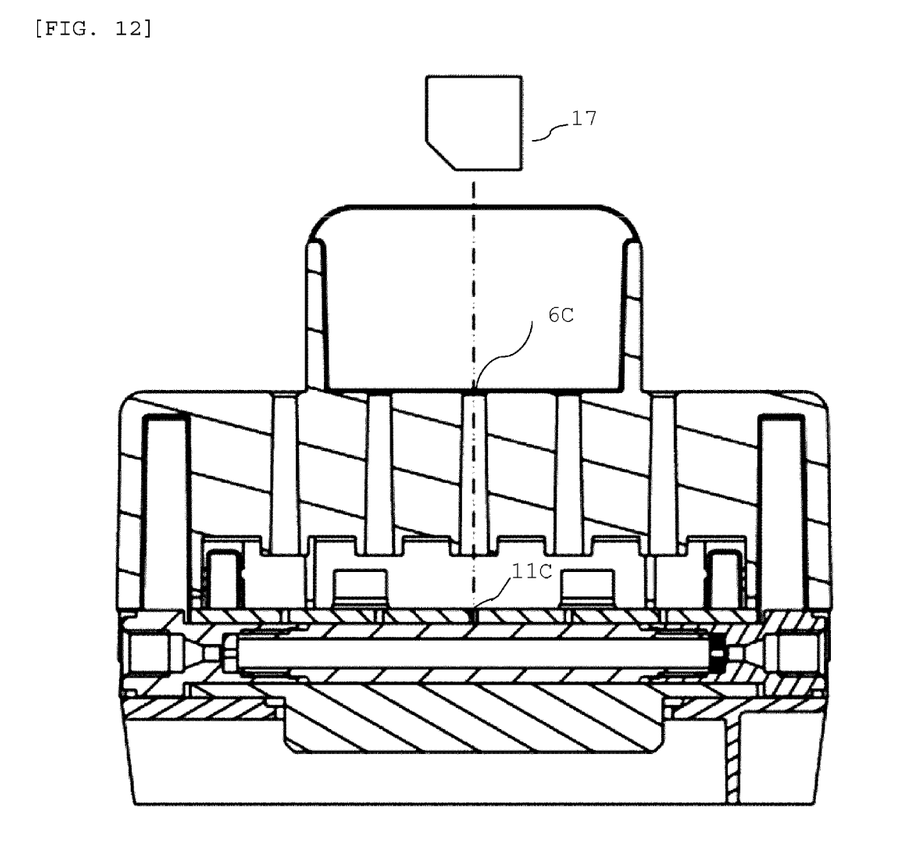
FIG. 12 is an explanatory view of another example of measuring the temperature of the analysis column inside a column cartridge.

FIG. 11 and FIG. 12 are the explanatory view of another example of measuring the temperature of the analysis column 10 inside the column cartridge 1.

FIG. 11 and FIG. 12 show a state where an infrared ray emitted from an infrared temperature sensor 17 passes through the window 6C and reaches the hole 11C formed in the upper metal block portion 8. The infrared temperature sensor 17 is moved from the state shown in FIG. 11 and FIG. 12, the infrared ray emitted from the infrared temperature sensor 17 passes through the other windows 6A, 6B, 6D, and 6E, passes through the holes 11A, 11B, 11D, and 11E formed in the upper metal block portion 8, and reaches the analysis column 10, and thus it is possible to detect the temperature of the analysis column 10.

Although not shown in FIG. 11 and FIG. 12, similar to the example shown in FIG. 8, the temperature of the analysis column 10 is displayed on the display 19.

The analyzer column cartridge 1 according to the first embodiment of the present invention includes the resin upper housing portion 2, the resin lower housing portion 3, the metal upper metal block portion 8 having a coefficient of high thermal conductivity, the heat transfer portion 7A, the metal lower metal block portion 7 having a coefficient of high thermal conductivity, in which a plurality of temperature detecting windows 6A, 6B, 6C, 6D, and 6E is formed in the upper housing portion 2, and the analysis column 10 is arranged between the upper metal block portion 8 and the lower metal block portion 7.

The heat transfer portion 7A contacts a heat source (not shown) outside the column cartridge 1, and contacts the analysis column 10 arranged between the upper metal block portion 8 and the lower metal block portion 7 to transmit heat. Using the plurality of temperature detecting windows 6A, 6B, 6C, 6D, and 6E, it is possible to detect the temperature of the analysis column 10 arranged between the upper metal block portion 8 and the lower metal block portion 7 by the temperature detecting device (the temperature sensor probes 15A, 15B, 15C, 15D, and 15E or the infrared temperature sensor 17).

Accordingly, there is no necessity to accommodate a heater, a temperature sensor, and an electronic component in the column cartridge 1, and it is possible to achieve an analyzer column cartridge that enables the temperature control of an analysis column while resource savings and cost savings are possible.

Moreover, when the column cartridge 1 is discarded, the separation of the heater, the temperature sensor, and the electronic component is unnecessary, and complicated work is unnecessary as well.

Furthermore, since it is possible to detect temperatures at a plurality of sites in the long direction of the analysis column 10 in a columnar shape, it is possible to sense the temperature profile of the entire analysis column 10, and it is possible to determine whether a balance is achieved at a prescribed temperature.

In addition, in the case in which a contact failure occurs between the heat transfer portion 7A of the lower metal block portion 7 and the analysis column 10, it is possible to detect this failure.

Note that the display 19 determines whether a contact failure occurs between the heat transfer portion 7A and the analysis column 10 based on the temperature detecting device (the temperature sensor probes 15A, 15B, 15C, 15D, and 15E or the infrared temperature sensor 17). In the case in which the display 19 determines that a contact failure occurs, the display 19 can display the contact failure.

Second Embodiment

Next, a second embodiment the present invention will be described.

Figure 13:
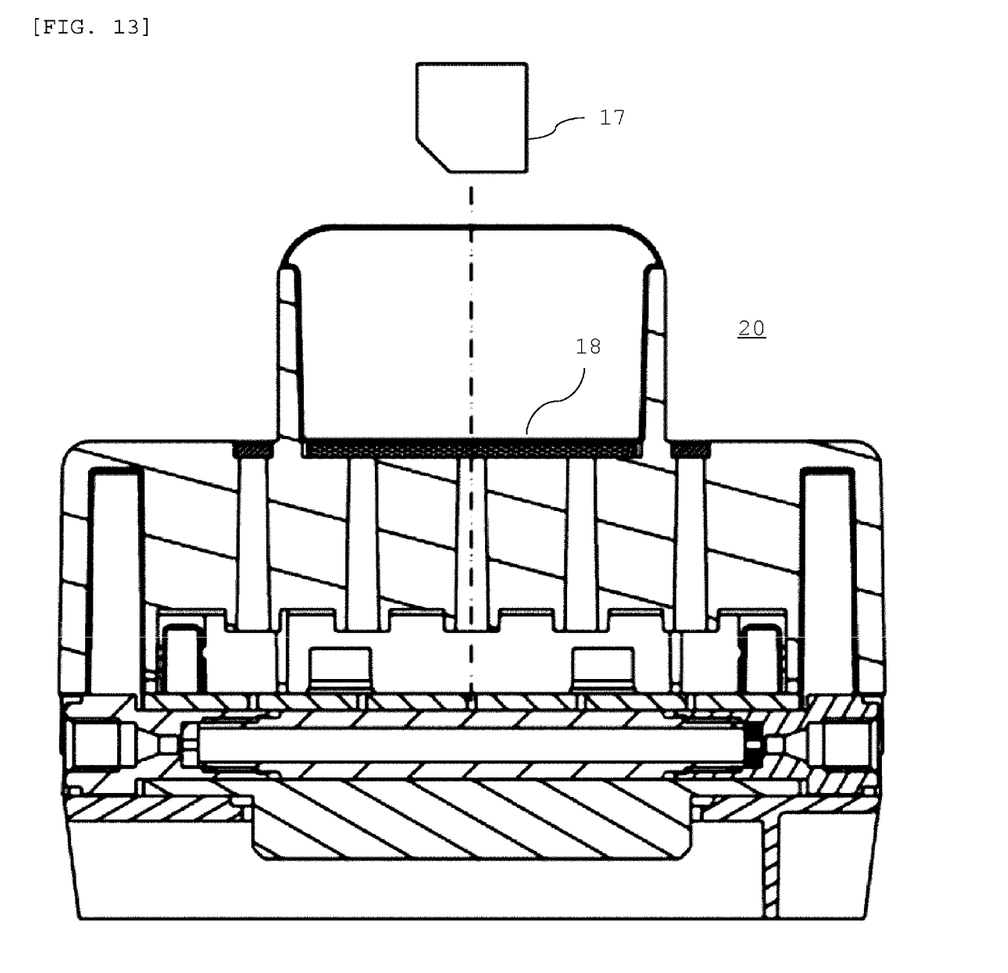
FIG. 13 is an explanatory view of a second embodiment.

FIG. 13 is the explanatory view of a second embodiment, and is a cross sectional view of a column cartridge 20 according to the second embodiment. In FIG. 13, the difference between the column cartridge 20 according to the second embodiment and the column cartridge 1 according to the first embodiment is that in the second embodiment, a shielding member 18 that covers windows 6A, 6B, 6C, 6D, and 6E is arranged. The other configurations are similar in the first embodiment and the second embodiment.

For example, the shielding member 18 is formed of a material that transmits infrared rays such as barium fluoride (BaF2). As shown in FIG. 13, an infrared ray emitted from an infrared temperature sensor 17, passes through the shielding member 18, and passes through the windows 6A, 6B, 6C, 6D, and 6E, and thus it is possible to detect the temperature of the analysis column 10.

Although not shown in FIG. 13, the second embodiment includes a display 19 that displays temperatures similar to the first embodiment.

According to the second embodiment, it is possible to obtain effects similar to those of the first embodiment, and the windows 6A, 6B, 6C, 6D, and 6E are covered with the shielding member 18, and thus it is possible to more quickly stabilize the temperature of the analysis column 10.

REFERENCE SIGN LIST 1, 20 column cartridge
2 upper housing portion
3 lower housing portion
3A opening
4, 9 channel opening
5 handle portion (projection)
6A, 6B, 6C, 6D, 6E window
7 lower metal block portion
7A heat transfer portion
8 upper metal block portion
10 analysis column
11A, 11B, 11C, 11D, 11E hole
15A, 15B, 15C, 15D, 15E temperature sensor probe
17 infrared temperature sensor
18 shielding member
19 display

The invention claimed is:

1. An analyzer column cartridge, comprising:
a metal block configured to accommodate an analysis column used in a liquid chromatography; and
a housing that accommodates the metal block, wherein
a plurality of holes that communicate with an accommodation space of the analysis column are formed in the metal block,
the housing has a plurality of windows formed at positions respectively facing the plurality of holes formed in the metal block, and
the housing includes an upper housing portion and a lower housing portion,
the metal block includes an upper metal block portion arranged to face the upper housing portion and a lower metal block portion arranged to face the lower housing portion,
the analysis column is to be arranged between the upper metal block portion and the lower metal block portion,
the plurality of holes are formed in the upper metal block portion, and
the plurality of windows are formed in the upper housing portion
a probe of a temperature detecting device is a plurality of rod-shaped temperature sensor probes, and the plurality of rod-shaped temperature sensor probes are configured to be inserted into the plurality of windows formed in the upper housing portion, and are inserted into the plurality of holes formed in the upper metal block portion, wherein
a temperature of the analysis column is detected by the temperature detecting device probe outside the analyzer column cartridge or infrared light generated from the temperature detecting device through the window and the hole facing the window.

2. The analyzer column cartridge according to claim 1, wherein the temperature detecting device is an infrared temperature sensor, infrared light generated from the temperature detecting device is to pass through the windows formed in the upper housing portion, and pass through the holes formed in the upper metal block portion, such that a temperature of the analysis column is detected.

3. An analyzer comprising:

the analyzer column cartridge according to claim 1; and a display configured to display the temperature detected by the plurality of rod-shaped temperature sensor probes.

4. The analyzer comprising:

the analyzer column cartridge according to claim 2; and a display configured to display the temperature detected by the infrared temperature sensor.

5. The analyzer column cartridge according to claim 1, wherein a handle portion is formed on the upper housing portion, and a part of the plurality of windows are formed at a position where the handle portion is formed.

6. The analyzer column cartridge according to claim 2, further comprising:

a shielding member that covers the plurality of windows and transmits the infrared light, wherein the infrared light generated from the infrared temperature sensor is to pass through the shielding member and the windows formed in the upper housing portion, and pass through the holes formed in the upper metal block portion, such that the temperature of the analysis column is detected.

7. The analyzer according to claim 3, wherein the lower metal block portion includes a heat transfer portion configured to contact the analysis column to transfer heat, the display is configured to determine whether or not a contact abnormality has occurred between the analysis column and the heat transfer portion based on the temperature detected by the plurality of rod-shaped temperature sensor probes, and the display is configured to, when it is determined that a contact abnormality has occurred, display the contact abnormality.

* * * * *